(12) United States Patent
Shimomura

(10) Patent No.: US 8,016,321 B2
(45) Date of Patent: Sep. 13, 2011

(54) STRADDLE TYPE VEHICLE

(75) Inventor: Tadashi Shimomura, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 171 days.

(21) Appl. No.: 12/335,931

(22) Filed: Dec. 16, 2008

(65) Prior Publication Data

US 2009/0166364 A1 Jul. 2, 2009

(30) Foreign Application Priority Data

Dec. 28, 2007 (JP) ................. 2007-341403

(51) Int. Cl.
*B62J 35/00* (2006.01)
(52) U.S. Cl. ......... 280/833; 280/830; 280/834; 280/835
(58) Field of Classification Search .................. 280/830, 280/833–835
See application file for complete search history.

(56) References Cited

U.S. PATENT DOCUMENTS

| | | | | |
|---|---|---|---|---|
| 5,884,380 | A * | 3/1999 | Thurm | 29/401.1 |
| 6,105,701 | A * | 8/2000 | Buell | 180/229 |
| 6,213,514 | B1 * | 4/2001 | Natsume et al. | 280/833 |
| 6,234,531 | B1 * | 5/2001 | Kurayoshi et al. | 280/835 |
| 6,341,792 | B1 * | 1/2002 | Okuma | 280/304.3 |
| D537,388 | S * | 2/2007 | Martell | D12/126 |
| 7,252,170 | B2 * | 8/2007 | Miyakozawa et al. | 180/219 |
| 7,360,620 | B2 * | 4/2008 | Takenaka et al. | 180/291 |
| 7,637,340 | B2 * | 12/2009 | Kawase | 180/219 |
| 7,665,770 | B2 * | 2/2010 | Yamamura | 280/835 |
| 7,690,689 | B2 * | 4/2010 | Muroo et al. | 280/833 |
| 7,712,564 | B2 * | 5/2010 | Schmidt et al. | 180/219 |
| 7,857,928 | B1 * | 12/2010 | Mackey | 156/94 |
| 2002/0063004 | A1 * | 5/2002 | Nagasaka | 180/69.4 |
| 2004/0124628 | A1 * | 7/2004 | Kurayoshi et al. | 280/835 |
| 2005/0110265 | A1 * | 5/2005 | Miyakozawa et al. | 280/835 |
| 2007/0200332 | A1 * | 8/2007 | Muroo et al. | 280/833 |
| 2009/0166364 | A1 * | 7/2009 | Shimomura | 220/562 |

FOREIGN PATENT DOCUMENTS

JP 53-082618 7/1978

* cited by examiner

*Primary Examiner* — Kevin Hurley
*Assistant Examiner* — Michael Stabley
(74) *Attorney, Agent, or Firm* — Keating & Bennett, LLP (57) ABSTRACT

A straddle type vehicle with its fuel tank covered with a tank cover, in which misalignment between a filler opening on an upper part of the fuel tank and an orifice for exposing the filler opening out of the tank cover is restrained. The tank cover includes a center cover on which the orifice is formed, and right and left side covers molded separately from the center cover and disposed on right and left sides of the center cover for covering the fuel tank from the side.

11 Claims, 14 Drawing Sheets

STRADDLE TYPE VEHICLE

RELATED APPLICATIONS

This application claims the benefit of priority under 35 USC 119 of Japanese patent application no. 2007-341403, filed on Dec. 28, 2007, which is hereby incorporated by reference.

BACKGROUND OF THE INVENTION

1. Field of the Invention

The present invention relates to a straddle type vehicle in which a fuel tank is covered with a tank cover molded in accordance with the outer shape of the fuel tank.

2. Description of Related Art

Conventionally, there is a motorcycle in which a fuel tank is covered with a tank cover (see JP-U-Sho 53-82618, for instance). The tank cover disclosed in JP-U-Sho 53-82618 is molded in accordance with the outer shape of the fuel tank and is bent inward (toward the transversal center of the vehicle) as it comes to the lower part.

However, a conventional tank cover such as that described above has the following problems:

(1) A tank cover that is bent inward as it comes to the lower part, as disclosed in JP-U-Sho 53-82618, is difficult to mold in one piece. In some cases, the tank cover is divided into separate right and left pieces that are molded separately, and then put together to make a whole tank cover. However, when covering a fuel tank in which a filler opening is provided on an upper part with a tank cover formed from separate right and left pieces, there is a problem in that misalignment often occurs between the positions of the filler opening and an orifice provided on the tank cover for exposing the filler opening. In other words, when a fuel tank having a filler opening on its upper part is covered with a tank cover, a semicircular cutout for exposing the filler opening must be formed in advance on each edge of the right piece of the tank cover ("the right cover") and the left piece of the tank cover ("the left cover"). An orifice for exposing the filler opening is then composed by matching the right and left cutouts. However, due to production errors generally observed on the fuel tank and its cover, it is difficult to position the cutouts on both the right and left covers precisely relative to the filler opening.

(2) Also, in a vehicle where a fuel tank strides over the body frame in the rear of the handlebar, it may be desired to dispose some components of the vehicle (electrical components such as regulator and battery, for instance) below the fuel tank. However, since the position of a lower edge of a conventional tank cover corresponds to the position of a lower end of the fuel tank, the tank cover is insufficient to cover the area below the fuel tank. Thus, components below the fuel tank are conspicuous, resulting in the problem of impaired external appearance of the vehicle body.

(3) Further, when the fuel tank is disposed above the engine, heat emitted by the engine flows toward the fuel tank. If the fuel tank is disposed in this position and is covered by a conventional tank cover described above, heat flowing into a gap between the fuel tank and the tank cover is a problem.

SUMMARY OF THE INVENTION

The present invention has been made in light of these problems and provides a straddle type vehicle in which misalignment between the orifice provided on the tank cover and the filler opening on the fuel tank is restrained.

The present invention also provides a straddle type vehicle in which components disposed in the area below the fuel tank are covered up and the external appearance of the vehicle body is improved.

The present invention also provides a straddle type vehicle in which heat emitted by the engine is restrained from flowing into the gap between the fuel tank and the tank cover.

A straddle type vehicle according to the present invention has a fuel tank having a filler opening on an upper part, and a tank cover for covering the fuel tank and having an orifice at the position of the filler opening. The tank cover includes a center cover on which the orifice is formed and that is molded integrally, and a pair of right and left side covers molded separately from the center cover and disposed on right and left sides of the center cover for covering the fuel tank from the side.

According to the invention, misalignment between the filler opening and the orifice on the tank cover for exposing the filler opening is restrained, compared with the case where a tank cover is molded into right and left members that are aligned with the filler opening.

The straddle type vehicle according to the present invention also has a body frame stretching toward the rear of the vehicle body, a fuel tank that strides over the body frame, and a tank cover covering the fuel tank. The tank cover extends downward past the lower face of the fuel tank to cover the area below the fuel tank from the front and from the side of the vehicle body.

According to the present invention, components disposed in the area below the fuel tank are covered up with the tank cover to improve the external appearance of the vehicle body.

Further, the straddle type vehicle according to the present invention has a fuel tank disposed above an engine, and a tank cover covering the fuel tank. The tank cover extends downward at the side of the fuel tank, and then stretches toward the transversal center of the vehicle body, with its end edge located below the fuel tank.

According to the present invention, heat emitted by the engine is restrained from flowing into the gap between the fuel tank and the tank cover. In this description, a straddle type vehicle is a vehicle on which a rider straddles the seat, such as a motorcycle, a four-wheel buggy, a snowmobile, and so on.

Other features and advantages of the invention will be apparent from the following detailed description, taken in conjunction with the accompanying drawings that illustrate, by way of example, various features of embodiments of the invention.

DETAILED DESCRIPTION OF THE INVENTION

Figure 1:
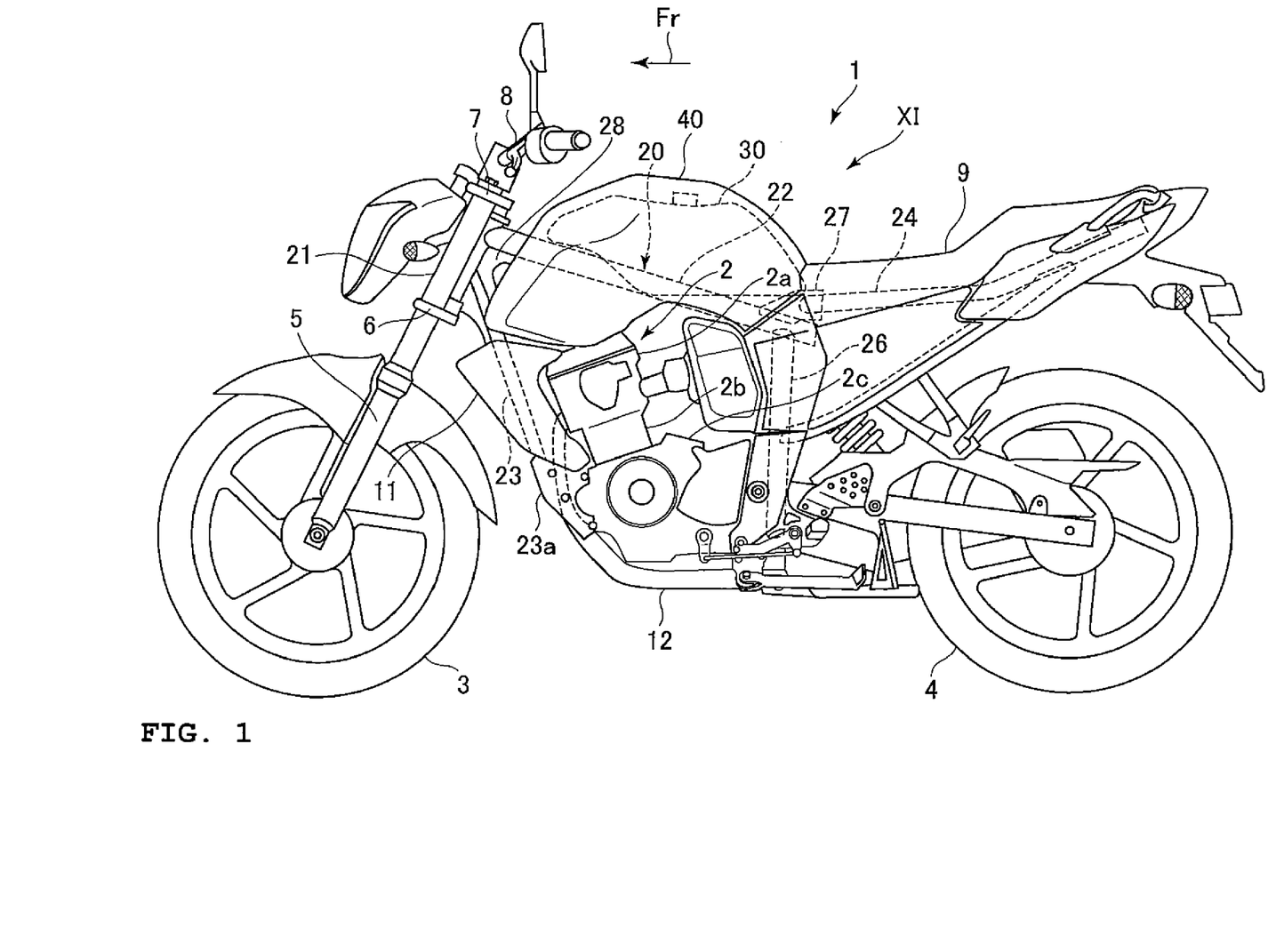
FIG. 1 is a side view of a motorcycle according to an embodiment of the present invention.
Figure 2:
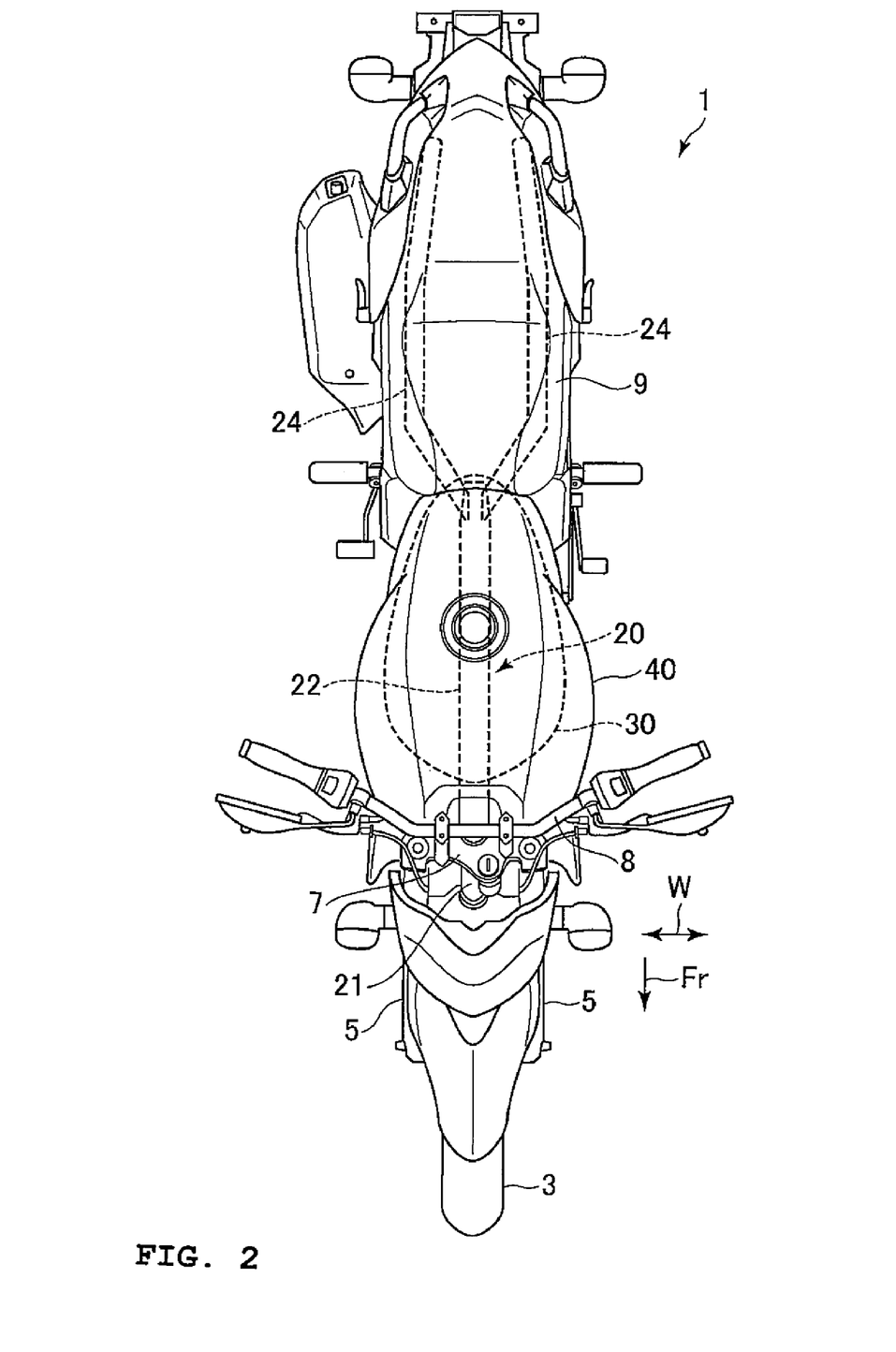
FIG. 2 is a top plan view of the motorcycle.
Figure 3:
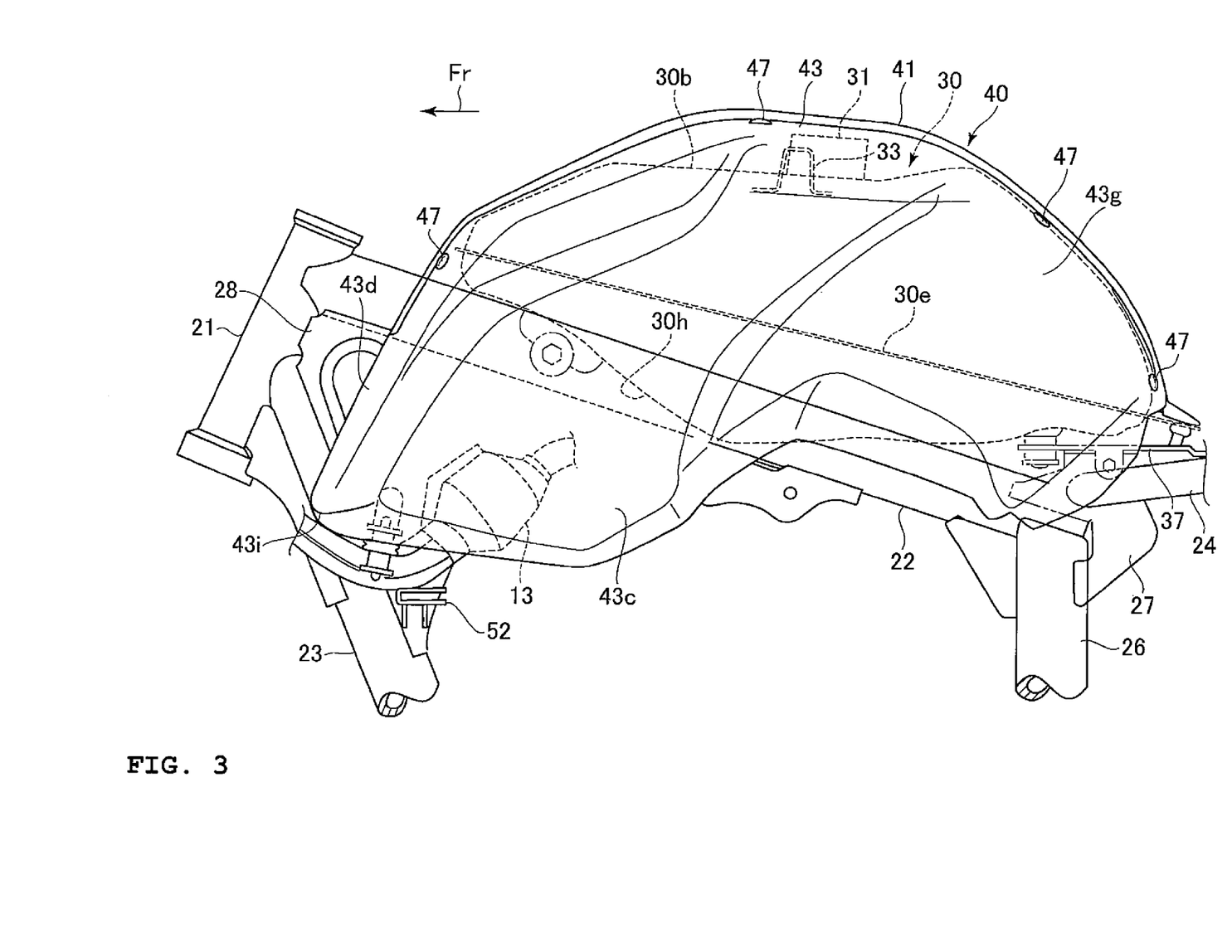
FIG. 3 is a side view of a part of the motorcycle, in which a fuel tank is disposed.
Figure 4:
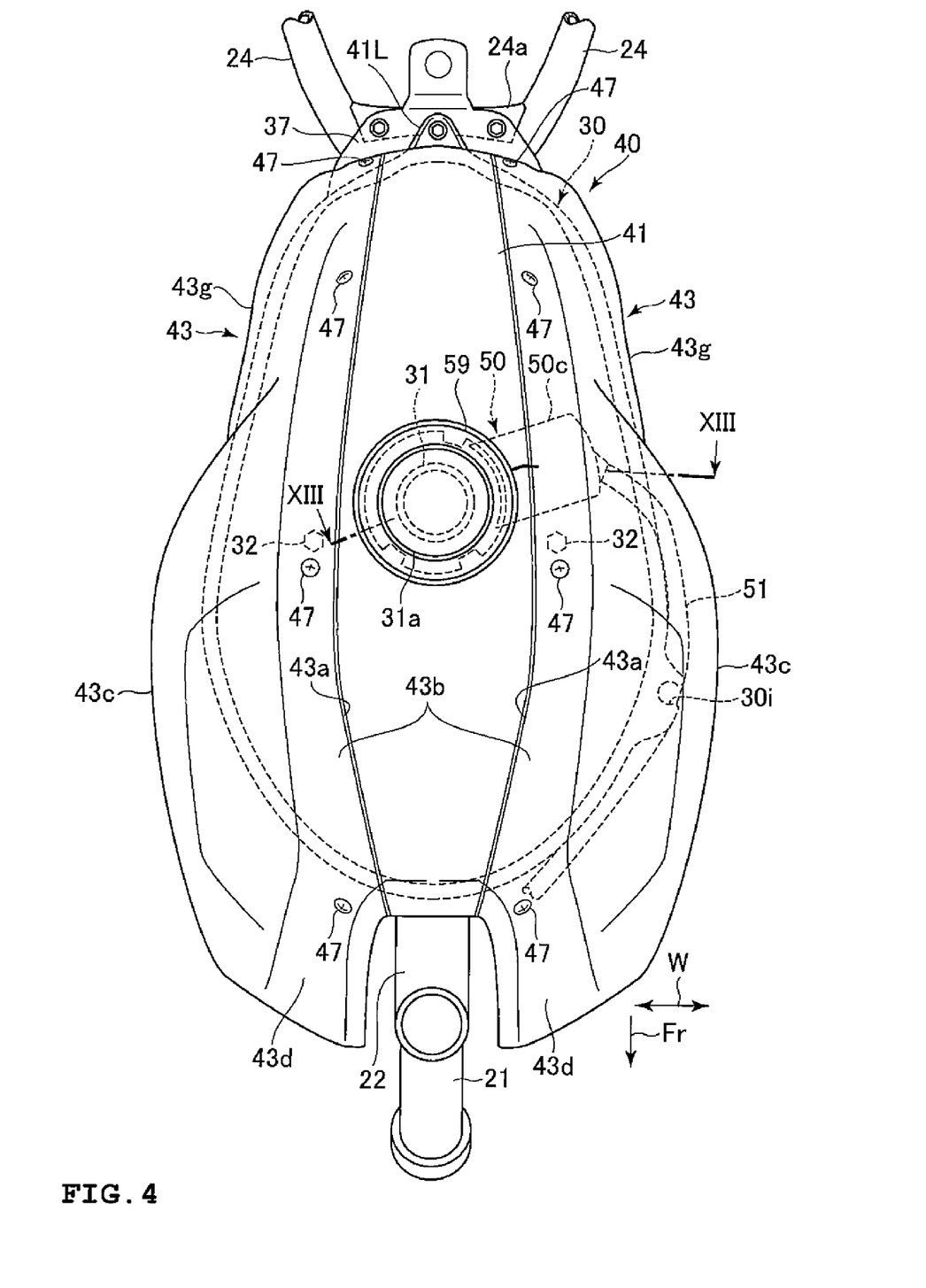
FIG. 4 is a top plan view of a part of the motorcycle, in which the fuel tank is disposed.

An embodiment of the present invention is now described with reference to the drawings. FIG. 1 is a side view of a motorcycle 1 as an example embodiment of the present invention, FIG. 2 is a top plan view of motorcycle 1, FIG. 3 is a side view of a part of motorcycle 1, in which a fuel tank 30 is disposed, and FIG. 4 is a top plan view of the relevant part in which fuel tank 30 is disposed.

As shown in FIGS. 1-4, motorcycle 1 includes an engine 2, a front wheel 3, a rear wheel 4, a body frame 20, fuel tank 30, and a tank cover 40. Body frame 20 includes a head pipe 21, a main tube 22, a down tube 23, and seat rails 24, 24.

As shown in FIG. 1, head pipe 21 is disposed at the front end of body frame 20 to support a steering shaft (not shown) disposed within head pipe 21. The upper and lower ends of the steering shaft are fixed to an upper bracket 7 and an under bracket 6, respectively. Upper bracket 7 and under bracket 6 retain front suspensions 5, 5 that support front wheel 3. A handlebar 8 is fixed to upper bracket 7 and can rotate to both sides together with front suspensions 5, 5 and front wheel 3.

The front end of main tube 22, and the front (top) end of down tube 23 are joined to head pipe 21. A gusset 28 is provided between and reinforces the front ends of main tube 22 and down tube 23 (see FIG. 3). Down tube 23 is located in front of engine 2 and stretches slantingly downward from head pipe 21. A bracket 23a for supporting engine 2 is provided at the lower end of down tube 23. A shroud 11 is disposed in front of engine 2 for guiding air flowing from the front toward engine 2 while the vehicle is traveling.

Main tube 22 is located above engine 2 in a transversal (the direction indicated by "W" in FIG. 2) center and stretches rearward from head pipe 21. Main tube 22 suspends engine 2. A vertical pipe 26 is joined to the rear end of main tube 22. Vertical pipe 26 stretches downward from the point where it joins to main tube 22. Seat rails 24 are joined to the rear end of main tube 22 via a bracket 27 and stretch rearward to support a seat 9 disposed above seat rails 24.

Rear wheel 4 is disposed below seat 9 and rotates by the driving force of engine 2 transmitted by chains, belts, and so on. Engine 2 has a crankcase 2c accommodating a crankshaft, a cylinder block 2b disposed on the top of crankcase 2c, and a cylinder head 2a mounted on the top of cylinder block 2b. Cylinder block 2b and cylinder head 2a extend slantingly upward in the rear of down tube 23. An exhaust pipe 12 is joined to cylinder head 2a to discharge exhaust gas generated by the driving of engine 2. Exhaust pipe 12 is projected forward from cylinder head 2a, and extends slantingly downward in front of cylinder head 2a and cylinder block 2b.

Figure 5:
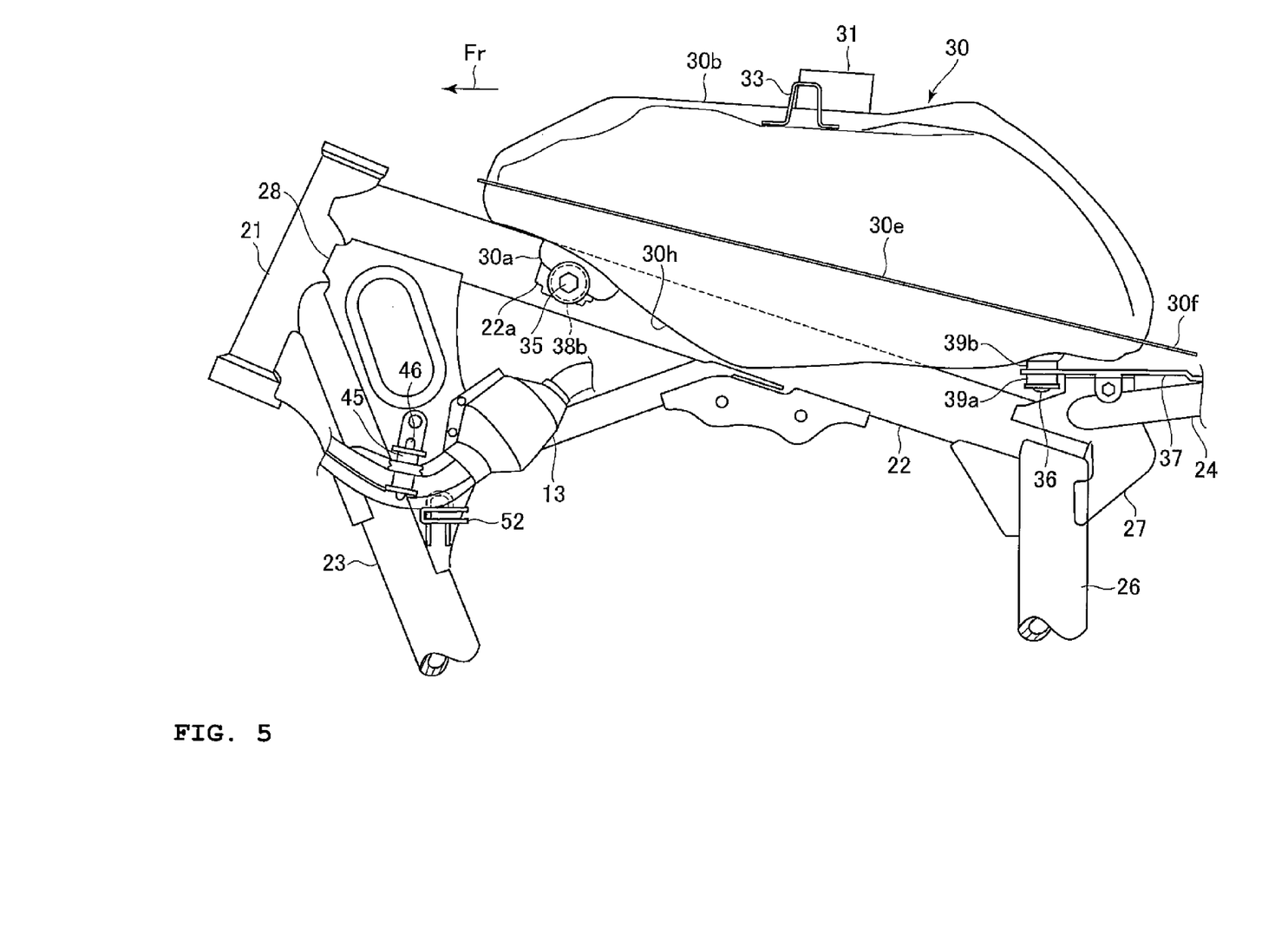
FIG. 5 is a side view of the fuel tank disposed on a main tube.
Figure 6:
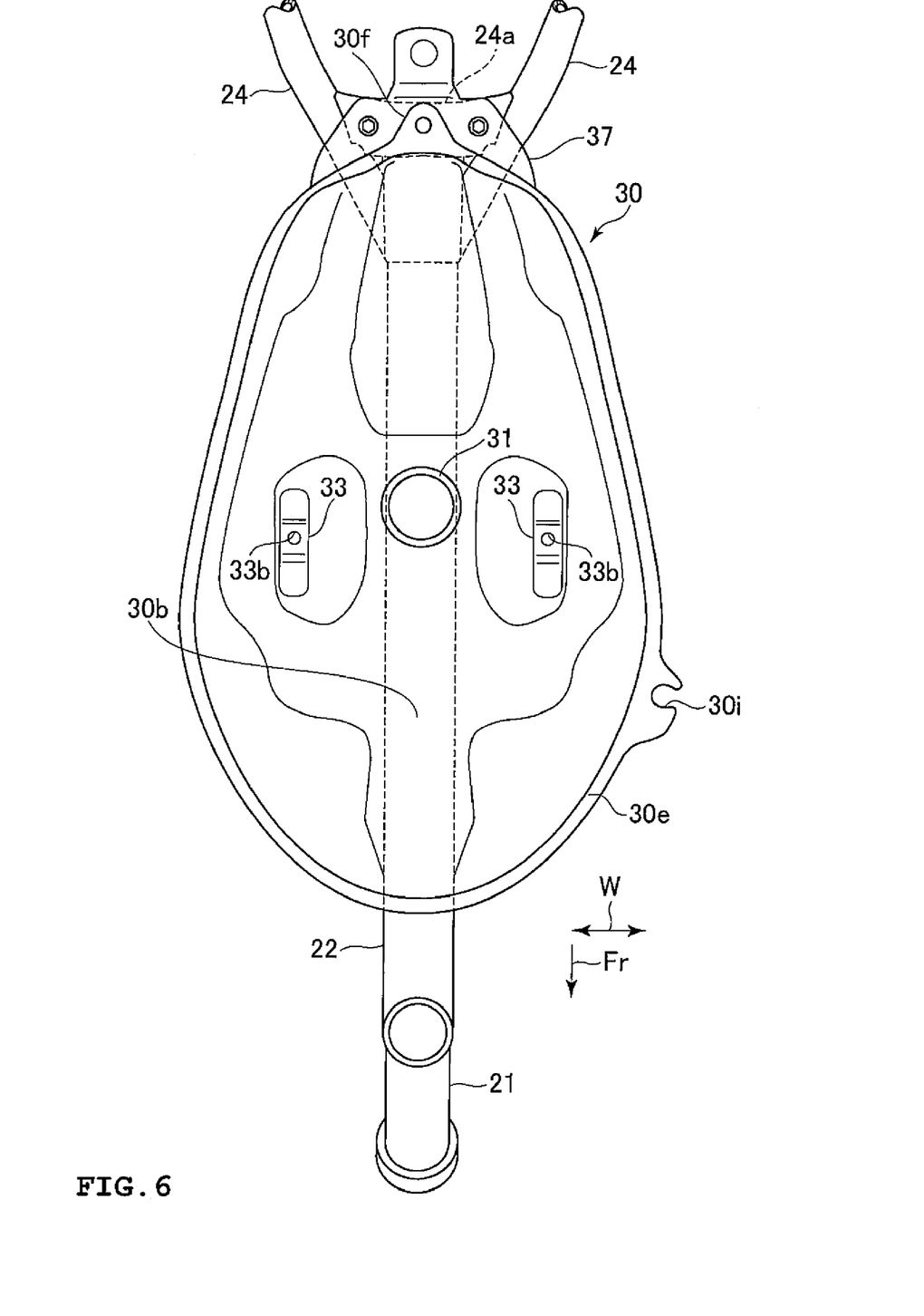
FIG. 6 is a top plan view of the fuel tank disposed on the main tube.
Figure 7:
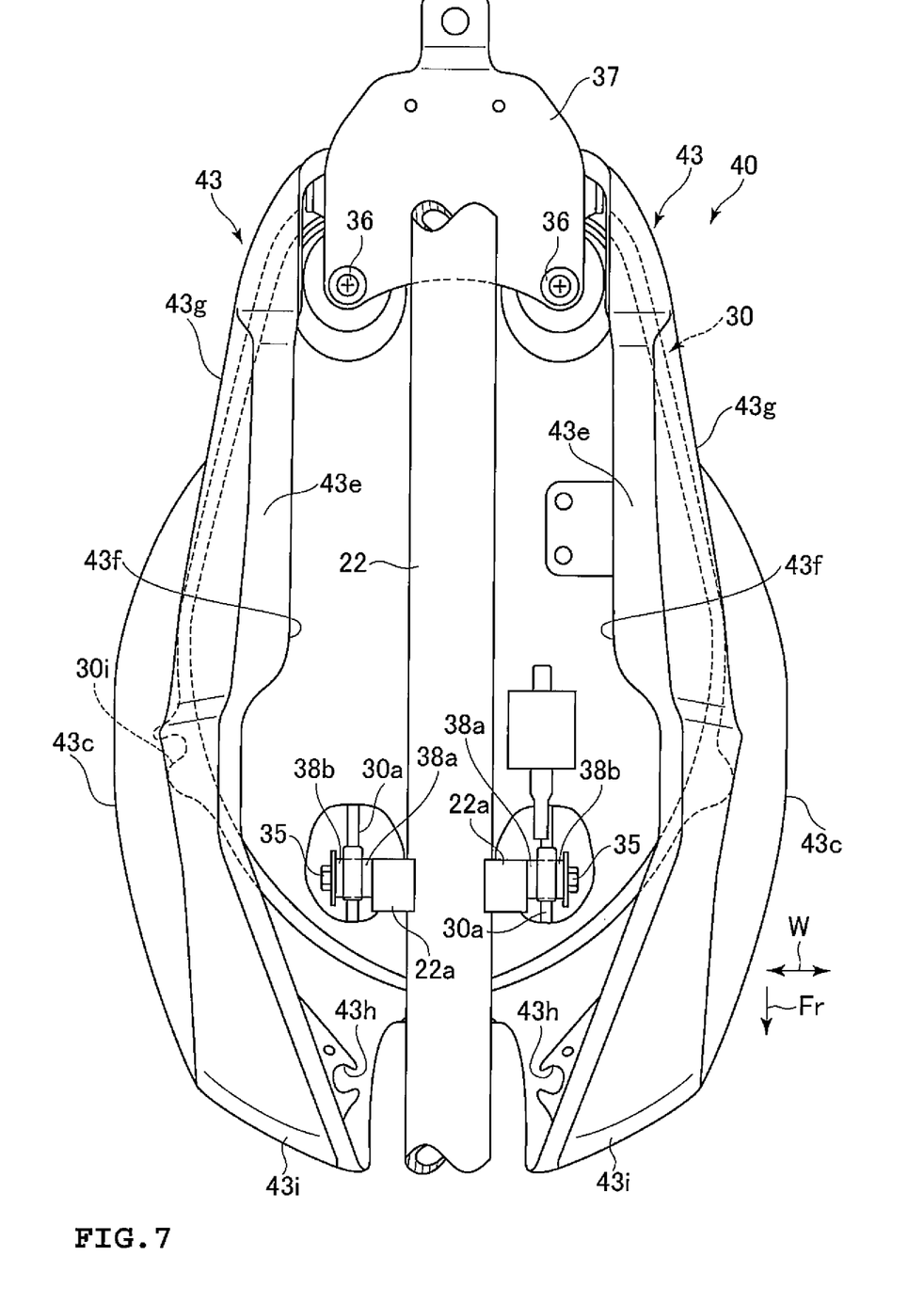
FIG. 7 is a bottom plan view of a tank cover and the fuel tank.
Figure 8:
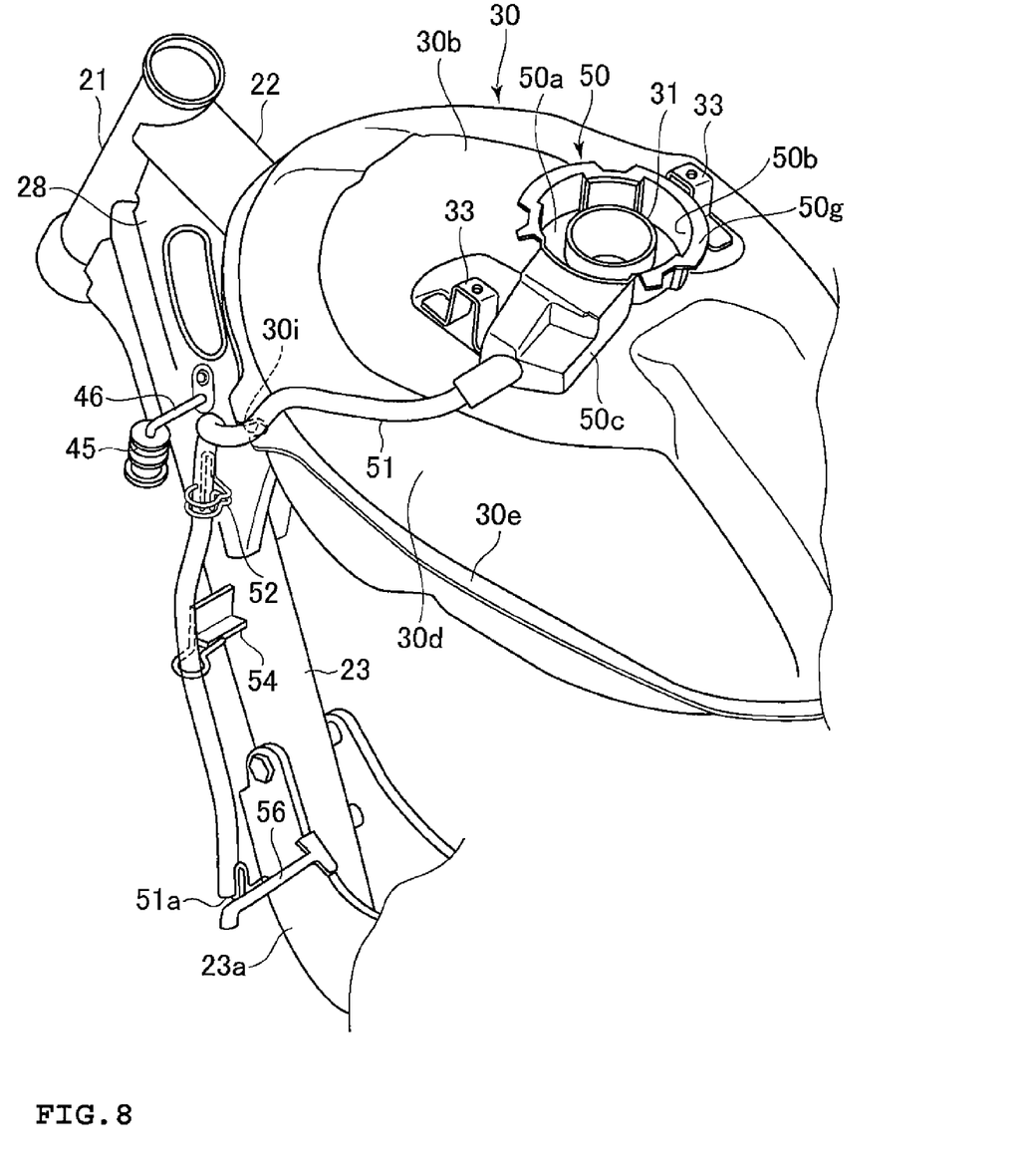
FIG. 8 is a perspective view of the fuel tank disposed on the main tube.

Fuel tank 30 is now described. FIG. 5 is a side view and FIG. 6 is a top plan view of fuel tank 30. FIG. 7 is a bottom plan view of fuel tank 30 and tank cover 40, and FIG. 8 is a perspective view of fuel tank 30.

Fuel tank 30 strides over main tube 22 between seat 9 and head pipe 21 (see FIG. 1) and is supported by body frame 20. Particularly, as shown in FIG. 5 or 7, a mounting plate 37 is provided below the rear part of fuel tank 30. Fuel tank 30 has an upper face area 30b, a side face area 30d, and a lower face area 30h. Upper face area 30b and side face area 30d are molded integrally to have a generally bowl shape prolonged in the fore-and-aft direction. Also, lower face area 30h has a bowl shape prolonged in the fore-and-aft direction. The front part of mounting plate 37 is fixed to the rear part of lower face area 30h by bolts 36. Mounting plate 37 is disposed on and fixed to a bracket 24a bridging front ends of seat rails 24 (see FIG. 6).

Mounting plate 37 is fixed to lower face area 30h of fuel tank 30 via dampers 39a, 39b, as shown in FIG. 5. Damper 39a is disposed between the head of bolt 36 and mounting plate 37, while damper 39b is disposed between lower face area 30h of fuel tank 30 and mounting plate 37. Dampers 39a, 39b are shaped annularly, and bolt 36 is inserted to penetrate the inside of the annular shape.

As shown in FIG. 5 or 7, brackets 30a project downward from lower face area 30h in the front part of fuel tank 30. Each bracket 30a is fixed to a bracket 22a provided on the side face of main tube 22 by a bolt 35 and dampers 38a, 38b.

As shown in FIG. 8, a filler opening 31 is provided on the upper part of fuel tank 30 for supplying fuel into fuel tank 30. Filler opening 31 is located in the vicinity of the transversal center of upper face area 30b of fuel tank 30. Filler opening 31 is shaped cylindrically and projects upward from upper face area 30b of fuel tank 30.

Figure 9:
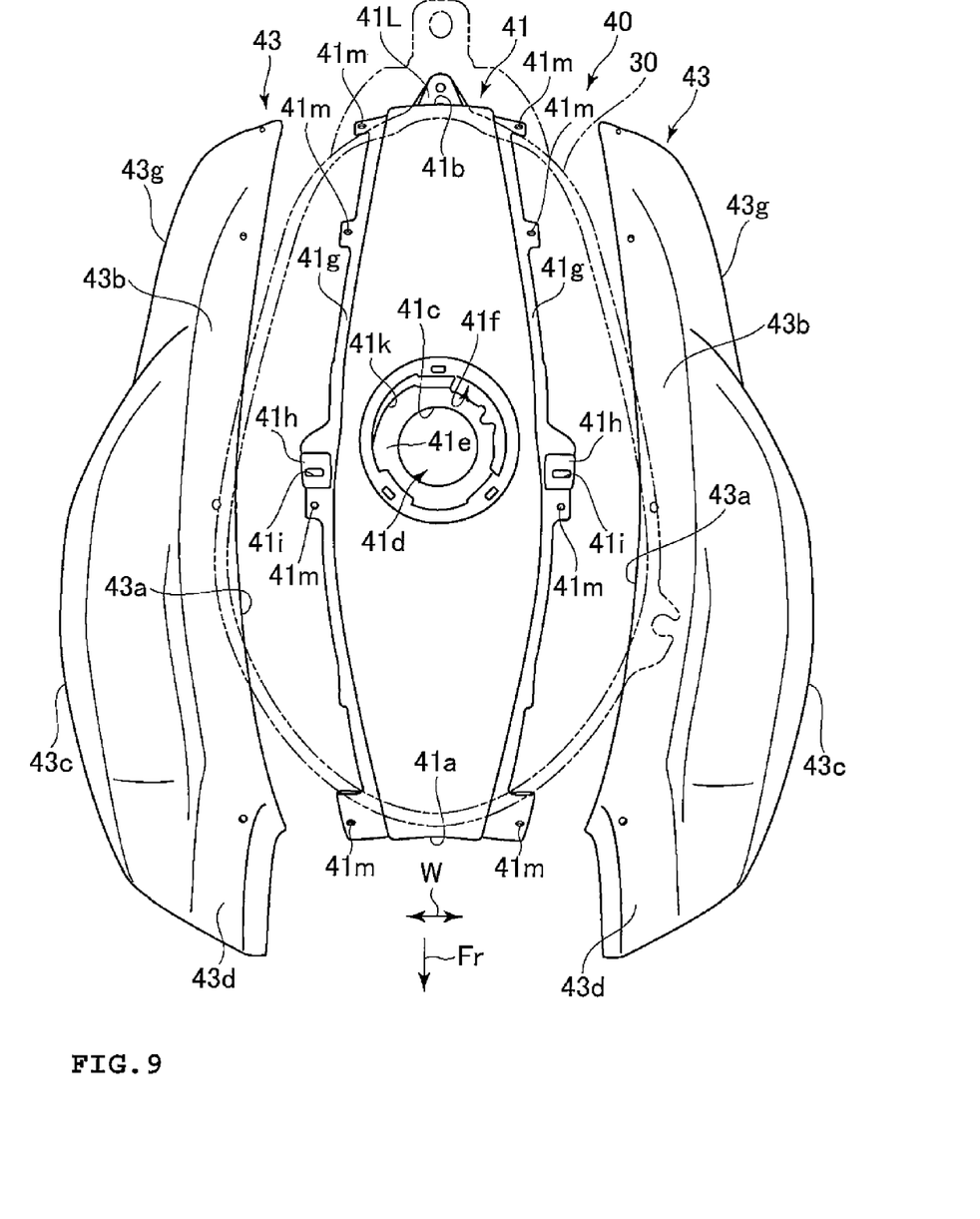
FIG. 9 is an exploded top plan view of the tank cover.
Figure 10:
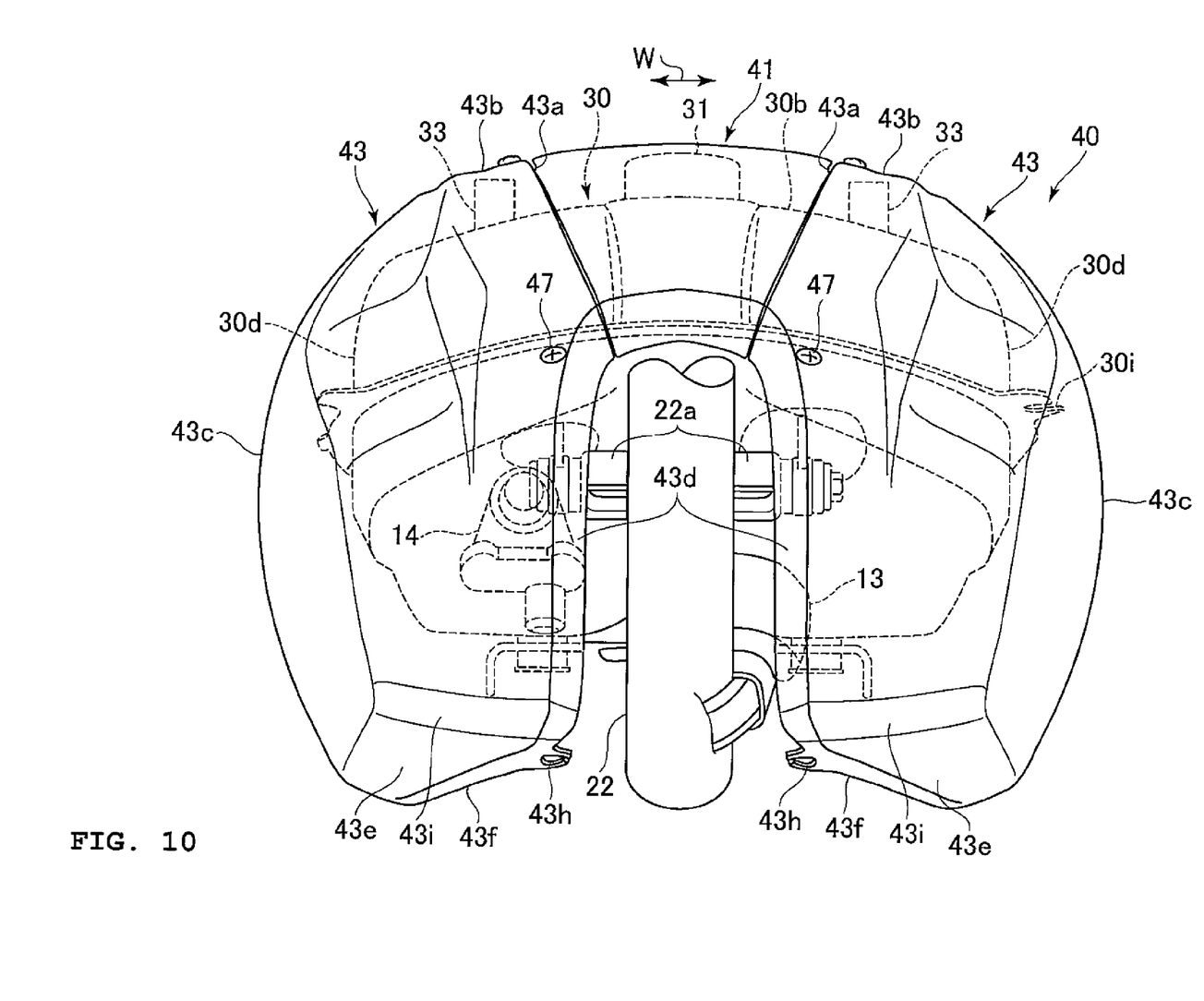
FIG. 10 is a front view of the tank cover.
Figure 11:
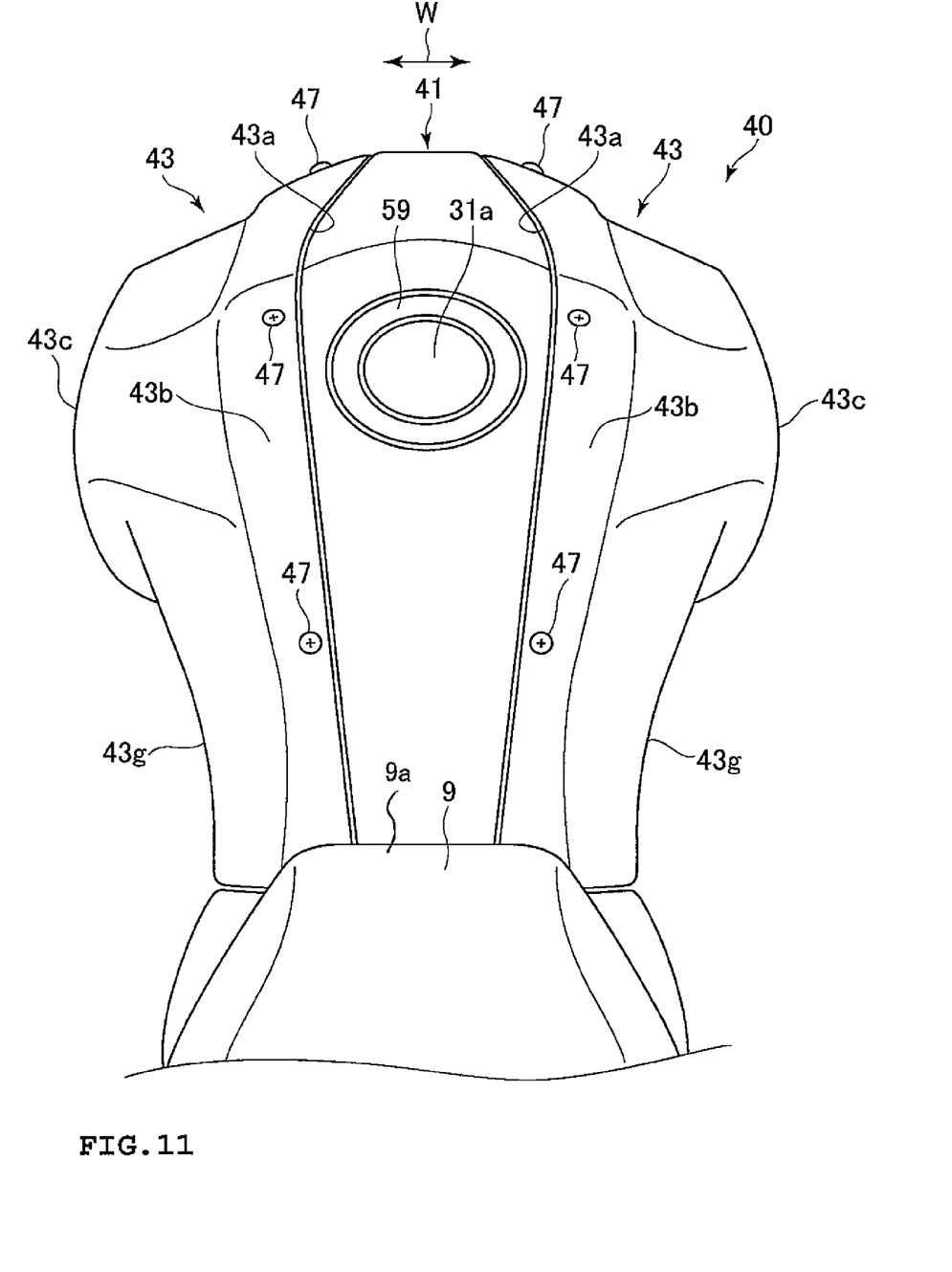
FIG. 11 is a perspective view of the tank cover when viewed in the direction of arrow XI of FIG. 1.

Tank cover 40 is now described. FIG. 9 is an exploded top plan view of tank cover 40, FIG. 10 is a front view of tank cover 40, and FIG. 11 is a perspective view of tank cover 40 viewed in the direction of arrow XI of FIG. 1. As shown in FIG. 9, tank cover 40 includes a center cover 41 disposed above the transversal center of fuel tank 30, and a pair of right and left side covers 43 disposed on right and left sides of center cover 41 and covering fuel tank 30 from the side (see FIG. 4).

Figure 12:
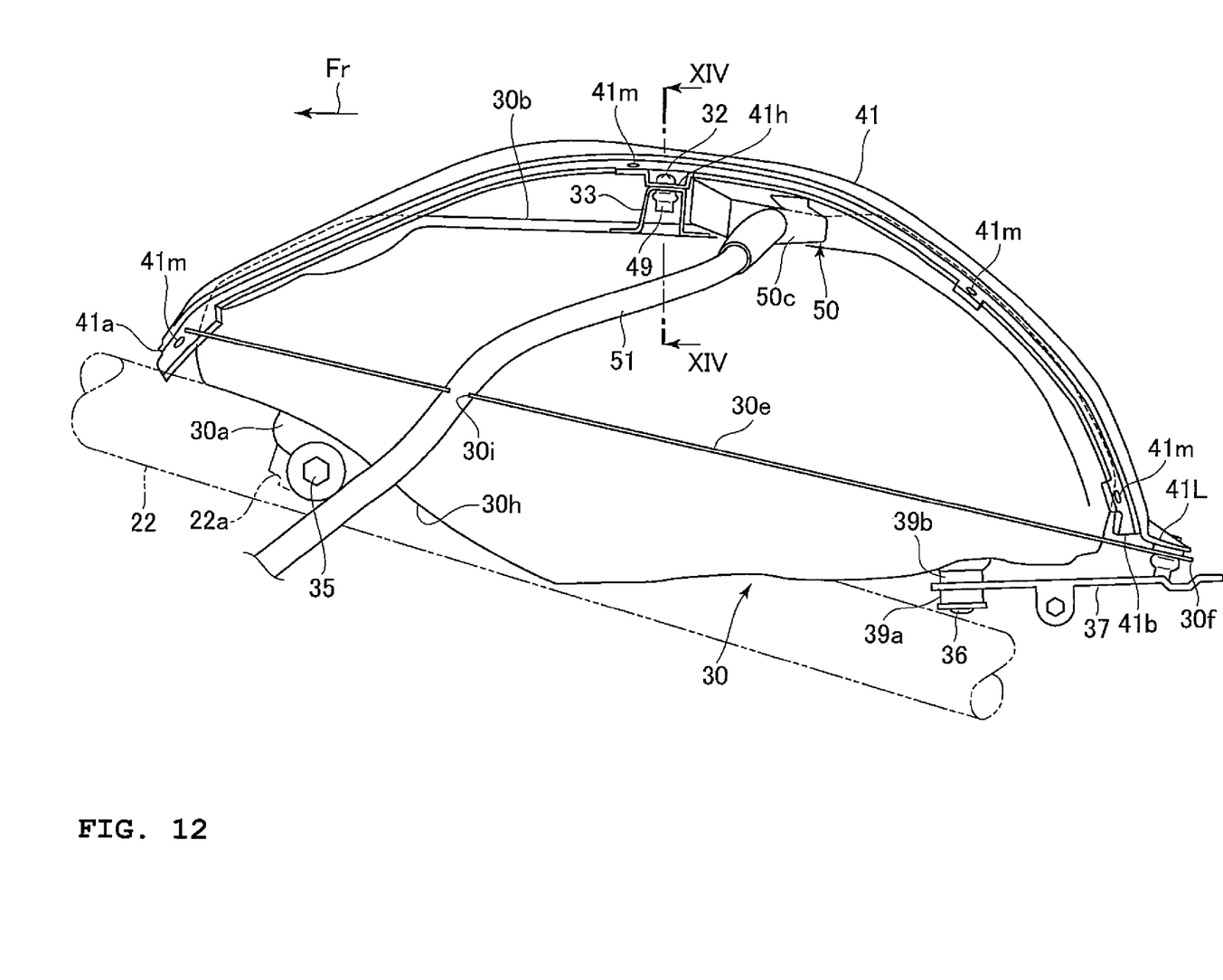
FIG. 12 is a side view of the fuel tank and the center cover mounted on the fuel tank.

FIG. 12 is a side view of fuel tank 30 and center cover 41 mounted on fuel tank 30. Center cover 41 has smaller width in comparison with that of fuel tank 30 (see FIG. 9), and is curved along the outer shape of fuel tank 30. Particularly, as shown in FIG. 12, a front end edge 41a of center cover 41 is positioned in front of the front end of fuel tank 30, and center cover 41 stretches slantingly rearward from front end edge 41a along upper face area 30b of fuel tank 30. A rear end edge 41b of center cover 41 is positioned rearward of the rear end of fuel tank 30.

Center cover 41 is a single member continuing from its front end edge 41a to rear end edge 41b. In one embodiment, center cover 41 is molded integrally using a resin. The entire part of center cover 41 is formed by die cutting, press work, or a similar method.

Figure 13:
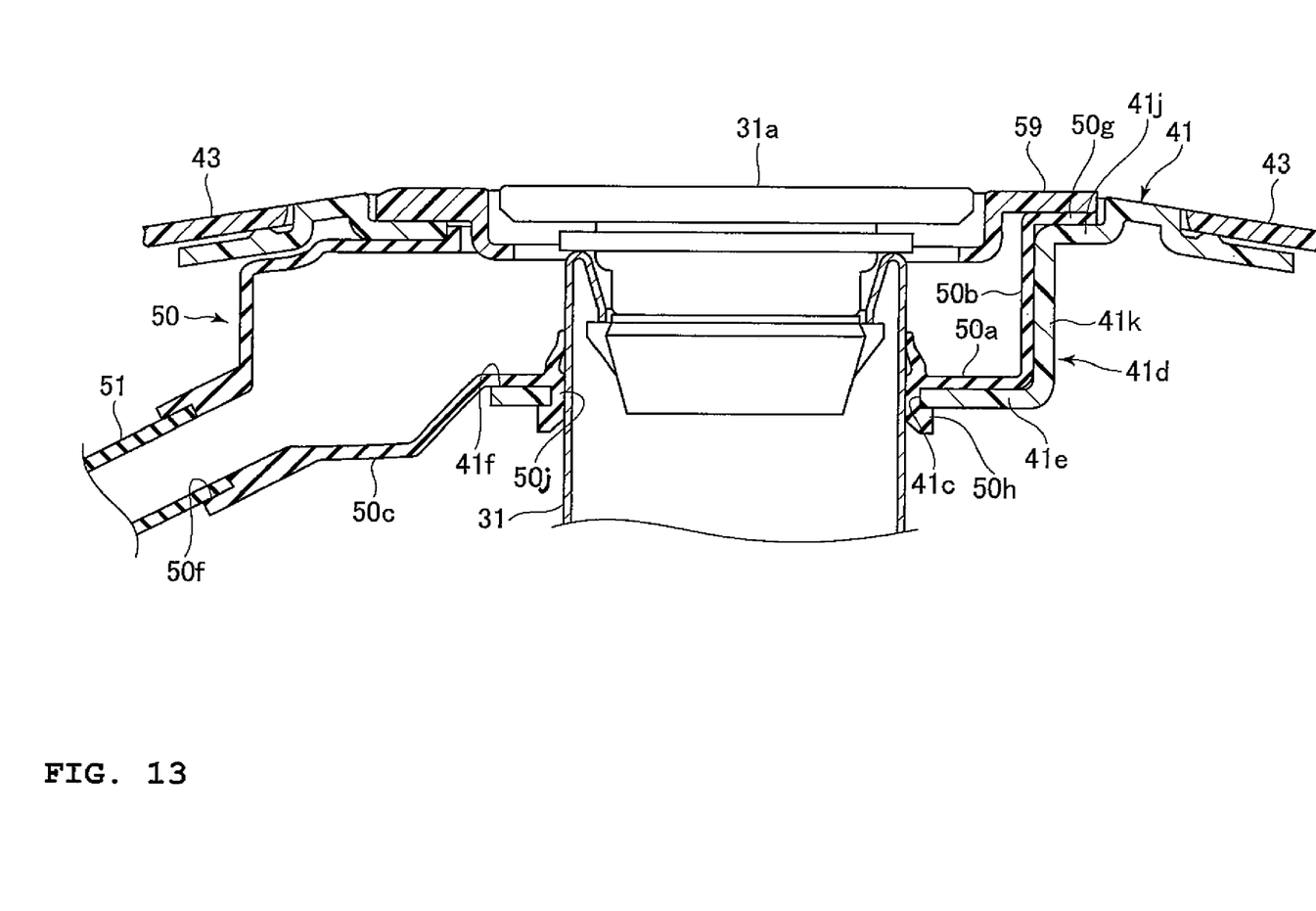
FIG. 13 is a sectional view taken along line XIII-XIII of FIG. 4.

As shown in FIG. 9, an orifice 41c is formed in the vicinity of the center in the fore-and-aft direction on center cover 41 for exposing filler opening 31. FIG. 13 is a sectional view taken along line XIII-XIII of FIG. 4. As shown in FIG. 9 or 13, a recess 41d is formed on center cover 41. Orifice 41c is formed in a bottom area 41e of recess 41d, and filler opening 31 is disposed on the inside of orifice 41c. A tank cap 31a is fitted in filler opening 31. Also, as shown in FIG. 8 or FIG. 13, a fuel receiver 50 is fitted in filler opening 31 for receiving fuel flowing out of the filler opening. A fuel pipe 51 is connected to fuel receiver 50 for draining fuel collected in fuel receiver 50 to the lower part of the vehicle body. Fuel receiver 50 and fuel pipe 51 are described later in more detail.

Side covers 43 are molded separately from center cover 41 and are disposed on right and left sides of center cover 41 to cover fuel tank 30 from the side (see FIG. 4 or 9). Side cover 43 expands sideways from end edge 43a on the center cover 41 side, and then extends downward (see FIG. 9 or 10). In other words, end edge 43a of side cover 43 is located above upper face area 30b of fuel tank 30. Side cover 43 has an upper face area 43b expanding sideways from end edge 43a. Side cover 43 also includes a front side area 43c and a rear side area 43g (see FIG. 9), both extending downward from upper face area 43b at the side of a side wall 30g of fuel tank 30.

As shown in FIG. 3 or 10, side cover 43 stretches downward past lower face area 30h of fuel tank 30 in the side view of the vehicle body, to cover the area below fuel tank 30 from the front and from the side of the vehicle body. In other words, fuel tank 30 strides over main tube 22, and a space is provided below fuel tank 30. Side cover 43 covers this space from the front and from the side.

In addition to front side area 43c, side cover 43 has a front face area 43d in its front part that stretches slantingly and vertically in front of fuel tank 30. Front side area 43c and front face area 43d extend downward past lower face area 30h of fuel tank 30. A lower end 43i of front face area 43d reaches a point where it overlaps with the upper end of down tube 23 in the side view.

Front side area 43c and front face area 43d cover components disposed below the front part of fuel tank 30 from the side and from the front. For example, a coupler 13 for connecting lead wires from electrical parts provided in the front part of the vehicle body (such as a speedometer and a switch mounted on handlebar 8) and lead wires from electrical parts provided in the rear part of the vehicle body (such as a battery, sensors, and control devices for controlling engine 2 and so on) is disposed below fuel tank 30 and on one side of main tube 22 (see FIG. 3 or 5). Side cover 43 covers coupler 13 from the front and from the side.

A valve mechanism 14 for controlling the amount of secondary air flowing through exhaust pipe 12 is disposed below fuel tank 30 and on the other side of main tube 22 (see FIG. 10). Side cover 43 covers valve mechanism 14 from the side and from the front. In this regard, it should be noted that electrical parts such as a battery, a regulator, and so on may be disposed in place of coupler 13 and valve mechanism 14.

As shown in FIG. 7 or 10, side cover 43 extends downward at the side of fuel tank 30, and then bends to stretch toward the transversal center of the vehicle body. An end edge 43f of side cover 43 is located below fuel tank 30.

In particular, side cover 43 extends downward at front side area 43c and at rear side area 43g, and then bends toward the transversal center of the vehicle body below fuel tank 30. A bottom face area 43e of side cover 43 extends from the lower end of front side area 43c and rear side area 43g toward the transversal center of the vehicle body. Bottom face area 43e stretches in the fore-and-aft direction below fuel tank 30, and is located between fuel tank 30 and engine 2.

Also, as shown in FIG. 11, left and right side covers 43 are shaped such that the distance between them decreases as they get closer to a front end of seat 9. In particular, rear side areas 43g extend downward from upper face area 43b, and at the same time they are slanted to progressively come closer to the transversal center of the vehicle body as they come to the rear part. Front side area 43c extends sideways further from upper face area 43a before stretching downward, and is thus positioned transversely outward relative to rear side area 43g.

Fuel receiver 50 and fuel pipe 51 provided around filler opening 31 are now described. As shown in FIG. 8 or 13, fuel receiver 50 has a bottom area 50a in which an orifice 50j for fitting filler opening 31 is formed, a wall area 50b rising from the outer periphery of bottom area 50a to surround filler opening 31, and a collecting area 50c for collecting fuel flowed out of filler opening 31. An orifice opening sideways (in the radial direction of filler opening 31) is formed on wall area 50b. Collecting area 50c extends laterally from the brim of the orifice. Recess 41d of center cover 41 has a wall area 41k surrounding filler opening 31, and an orifice 41f is formed on wall area 41k (see FIG. 9). Collecting area 50c stretches to the outer side of recess 41d from orifice 41f. A connecting hole 50f is formed at the back of collecting area 50c, and fuel pipe 51 is connected to connecting hole 50f.

As shown in FIG. 13, an upper edge 50g on wall area 50b of fuel receiver 50 is formed into a flange (see FIG. 8), located on edge 41j of recess 41d. Further, upper edge 50g is sheathed by an annularly-shaped jacket cover 59 from above.

As shown in FIG. 8, fuel pipe 51 stretches downward along side face area 30d of fuel tank 30. Fuel pipe 51 stretches further downward past lower face area 30h of fuel tank 30 and along down tube 23, until it reaches a bracket 23a provided at the lower end of down tube 23. A flange part 30e is formed on the outer face of fuel tank 30, and a notch 30i is formed on flange part 30e for holding fuel pipe 51 (see FIG. 6). Holding fixtures 52, 54 for holding fuel pipe 51 are fixed to gusset 28 and down tube 23, and a stay 56 is fixed to bracket 23a for supporting lower end 51a of fuel pipe 51 from below.

Fuel receiver 50 is mounted on filler opening 31 by orifice 50j of fuel receiver 50 being fitted into the outer side of filler opening 31 (see FIG. 13). Also, center cover 41 is positioned relative to filler opening 31 by being mounted on fuel receiver 50. In particular, a lower flange part 50h tightly fitted to the external face of filler opening 31 is formed at the brim of orifice 50j of fuel receiver 50. The diameter of orifice 41c of center cover 41 is generally the same as the outside diameter of lower flange part 50h of fuel receiver 50. Lower flange part 50h is fitted to the inside of orifice 41c. Thus, the position of the center for orifice 41c of center cover 41 corresponds to the position of the center for filler opening 31.

The mounting structure of tank cover 40 is now described. As shown in FIG. 12, center cover 41 is mounted on fuel tank 30, and is supported in a position that is apart from upper face area 30b. In particular, brackets 33 are provided on upper face area 30b of fuel tank 30 and are located on both sides of filler opening 31, and rise upward from upper face area 30b. Center cover 41 is fixed to bracket 33 by a bolt 32, thereby providing a gap for disposing fuel pipe 51 and fuel receiver 50 between center cover 41 and upper face area 30b.

Figure 14:
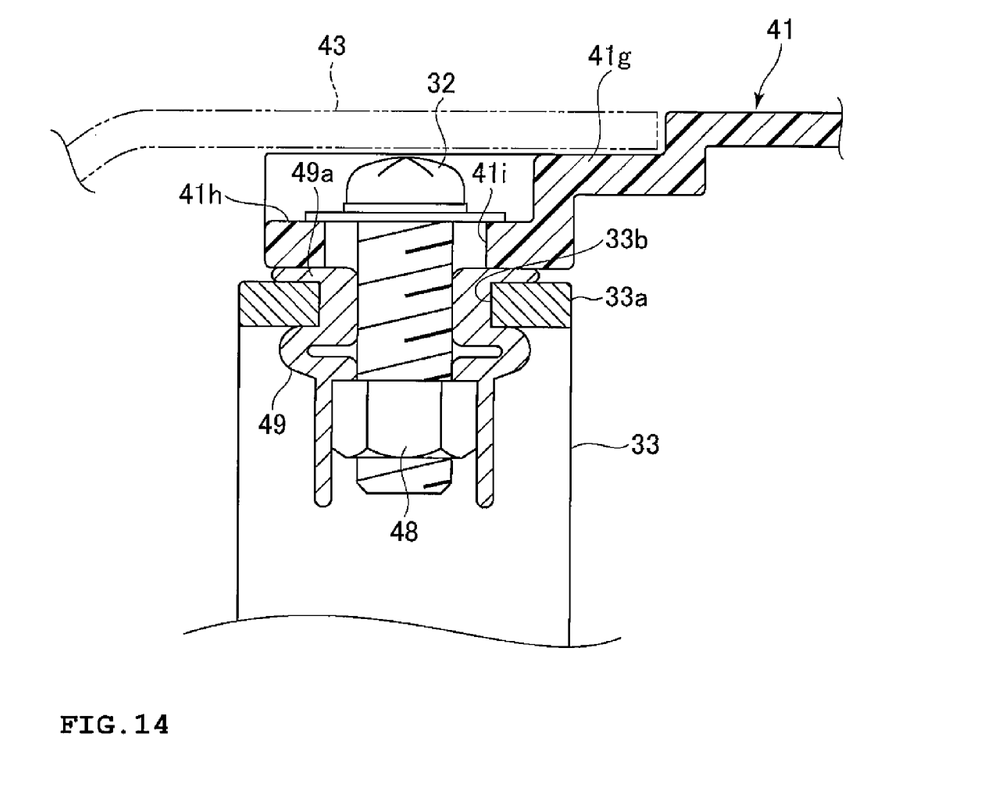
FIG. 14 is a sectional view taken along line XIV-XIV of FIG. 12.

FIG. 14 is a sectional view taken along line XIV-XIV of FIG. 12. Center cover 41 is fixed to fuel tank 30, with its position being determined by filler opening 31 and fuel receiver 50 (with the position of the center for orifice 41c of center cover 41 aligned with the position of the center for filler opening 31). Center cover 41 is allowed to make a slight movement in relation to fuel tank 30 before bolt 32 is tightened up. Then, center cover 41 is fixed onto fuel tank 30 by tightening up bolt 32 at the appropriate position defined by filler opening 31 and fuel receiver 50.

In particular, as shown in FIG. 9 or 14, an end edge 41g in the transversal direction on center cover 41 is provided with a mounting area 41h to be fixed to bracket 33 by bolt 32. A mounting hole 41i is formed in mounting area 41h, through which bolt 32 is inserted. Mounting hole 41i is made as a slot so that center cover 41 can move relative to fuel tank 30. Alternatively, rather than a slot, mounting hole 41i may be a circular hole having a diameter larger than bolt 32.

A shock absorbing member 49 is sandwiched between an upper face 33a of bracket 33 and mounting area 41h of center cover 41. Shock absorbing member 49 is molded into a cylindrical shape using rubber and is fitted in a mounting hole 33b formed in upper face 33a. A flange part 49a extending in the shape of a flange is formed at one end of shock absorbing member 49 and is sandwiched between upper face 33a and mounting area 41h. A nut 48 to be tightened up by bolt 32 is disposed on the inside of shock absorbing member 49 and is held by shock absorbing member 49 by the underside of upper face 33a.

As shown in FIG. 6 or 12, a projecting piece 30f projecting rearward is provided at the rear end of flange part 30e of fuel tank 30. A projecting piece 41L projecting rearward is also provided at the rear end of center cover 41 (see FIG. 4). Projecting pieces 30f, 41L are fixed to each other by a fastener such as a bolt.

Side cover 43 is supported by fuel tank 30 by being mounted on center cover 41. In particular, multiple (four, in this embodiment) mounting holes 41m are formed along end edge 41g of center cover 41 (see FIG. 9). Side cover 43 is fixed to mounting holes 41m by bolts 47 (see FIG. 4).

As shown in FIG. 5 or 8, a stay 46 provided on body frame 20 supports side cover 43 below fuel tank 30. Stay 46 is fixed to gusset 28 provided between the front ends of main tube 22 and down tube 23. A shock absorbing member 45 which, for instance, is molded into a cylindrical shape using rubber, is provided at the end of stay 46. As shown in FIG. 7 or 10, a projecting piece 43h projecting toward the transversal center of the vehicle body is formed on bottom face area 43e of side cover 43. Projecting piece 43h holds shock absorbing member 45, and thus side cover 43 is also supported by body frame 20.

In motorcycle 1, tank cover 40 includes center cover 41 on which orifice 41c is formed for exposing filler opening 31 and that is molded integrally, and right and left side covers 43 molded separately from center cover 41 and disposed on right and left sides of center cover 41 for covering fuel tank 30 from the side (see FIG. 9). Thus, misalignment between filler opening 31 and orifice 41c for exposing filler opening 31 is restrained, compared with a case where a tank cover is molded in two right and left pieces that are aligned with the filler opening.

Also, in motorcycle 1, tank cover 40 is mounted on fuel tank 30. Thus, misalignment between fuel tank 30 and tank cover 40 is restrained, compared with a case where tank cover 40 is supported by mounting it to body frame 20.

Also in motorcycle 1, right and left side covers 43 spread out sideways respectively from edge 43a on the center cover 41 side, and then extend downward (see FIG. 10 or 11). This structure allows edge 41g of center cover 41 and edge 43a of side cover 43 to be aligned horizontally. Thus, the mounting of side cover 43 to center cover 41 is easier compared with a case where edges 41g and 43a must be aligned vertically.

Further, in motorcycle 1, seat 9 is disposed in the rear of fuel tank 30, and side covers 43 are formed so that the distance between them decreases as they get closer to a front end of seat 9. Thus, the area to be sandwiched by the knees of the rider is narrower, resulting in improved riding feel and controlling ability.

Also, in motorcycle 1, tank cover 40 extends downward past lower face area 30h of fuel tank 30, to cover the area below fuel tank 30 from the front and from the side of the vehicle body (see FIG. 3 or 10). Thus, components disposed below fuel tank 30 (valve mechanism 14 and coupler 13 in the description above) are concealed by the tank cover, to improve the external appearance of the vehicle body.

Further, in motorcycle 1, main tube 22 runs through the transversal center of the vehicle body, and stretches to the rear of the vehicle body (see FIG. 4). Thus, a greater space is provided below fuel tank 30 compared with a case where two main tubes running in parallel with each other are provided below the fuel tank.

Also, in motorcycle 1, body frame 20 has stay 46 to support tank cover 40 below fuel tank 30 (see FIG. 5). This structure gives the stable support for tank cover 40.

Further, in motorcycle 1, tank cover 40 shrouds components of motorcycle 1 (valve mechanism 14 and coupler 13 in the description above) disposed below fuel tank 30 from the side and from the front (see FIG. 10). This structure increases the degree of freedom in the layout of the components provided on the motorcycle.

Also, in motorcycle 1, tank cover 40 extends downward at the side of fuel tank 30 and then stretches toward the transversal center of the vehicle body, with its end edge 43f being located below fuel tank 30 (see FIG. 7). This structure restrains heat emitted by engine 2 from entering into the gap between fuel tank 30 and tank cover 40.

The present invention is not limited to motorcycle 1 configured as described above, and various modifications are practicable. For instance, in the description above, tank cover 40 is divided into 3 pieces in the left-to-right direction, with each piece being molded separately, but the tank cover may instead be divided in the fore-and-aft direction. And, an orifice for exposing the filler opening may be formed on any of the pieces constituting the tank cover.

Also in the description above, center cover 41 has a width narrower than that of upper face area 30b of fuel tank 30, but center cover 41 may be molded to have a wider width for covering the entire upper face area 30b from above.

In addition, in the description above, front side areas 43c and 43d of side cover 43 stretch downward substantially past lower face area 30h of fuel tank 30, but rear side area 43g in addition to front side areas 43c and 43d may stretch downward substantially past lower face area 30h of fuel tank 30.

Further, while a motorcycle has been described as an example of a straddle type vehicle, the present invention also applies to other types of vehicles such as, for example, all terrain vehicles or snowmobiles.

The invention claimed is:

1. A straddle type vehicle comprising:
   a fuel tank including a filler opening on an upper portion thereof; and
   a tank cover arranged to cover the fuel tank and including an orifice at a position corresponding to the filler opening on the upper portion of the fuel tank, the tank cover including:
      an integrally molded center cover, the center cover including the orifice; and
      side covers molded separately from the center cover, the side covers attached to the center cover and arranged to extend below the center cover so as to cover sides of the fuel tank.

2. The straddle type vehicle according to claim 1, wherein the side covers includes a right side cover and a left side cover disposed on a right side and a left side of the center cover.

3. The straddle type vehicle according to claim 2, wherein the right side cover and the left side cover extend laterally sideways from edges attached to the center cover, and then downward to cover the sides of the fuel tank.

4. The straddle type vehicle according to claim 2, further comprising:
   a seat arranged for a rider to sit on rearward of the fuel tank; wherein
   a distance between the right side cover and the left side cover decreases as the right side cover and the left side cover extend toward to a front end of the seat.

5. The straddle type vehicle according to claim 1, wherein the tank cover is mounted on the fuel tank.

6. A straddle type vehicle comprising:
a body frame arranged to extend toward a rear of a vehicle body;
a fuel tank arranged to straddle the body frame, the fuel tank including a filler opening; and
a tank cover arranged to cover the fuel tank, the tank cover including:
- a center cover including an orifice arranged above the filler opening; and
- side covers separately provided from the center cover, each of the side covers being fixed to the center cover through fastening elements; wherein the side covers of the tank cover extends downward past a lowermost surface of the fuel tank to cover an area below the fuel tank from a front and a side of the vehicle body.

7. The straddle type vehicle according to claim 6, wherein the body frame extends through a transversal center of the vehicle body, and extends toward the rear of the vehicle body.

8. The straddle type vehicle according to claim 7, wherein the body frame includes a stay arranged to support the tank cover in the area below the fuel tank.

9. The straddle type vehicle according to claim 6, further comprising:
components of the straddle type vehicle disposed below the fuel tank; wherein
the tank cover shrouds the components from the front and the side of the vehicle body.

10. The straddle type vehicle according to claim 9, wherein the components include a wire coupler and a valve mechanism.

11. A straddle type vehicle comprising:
a vehicle body;
an engine;
a fuel tank disposed above the engine, the fuel tank including a filler opening; and
a tank cover arranged to cover the fuel tank, the tank cover including:
- a center cover including an orifice arranged above the filler opening; and
- side covers separately provided from the center cover, each of the side covers being fixed to the center cover through fastening elements; wherein the side covers of the tank cover extends downward at a side of the fuel tank, and then extends toward a transversal center of the vehicle body such that an entire end edge of the tank cover is located directly underneath the fuel tank.

* * * * *